July 5, 1955 R. J. SAMANIE 2,712,152
SHRIMP-PEELING AND CLEANING DEVICE
Filed July 21, 1952 4 Sheets-Sheet 3
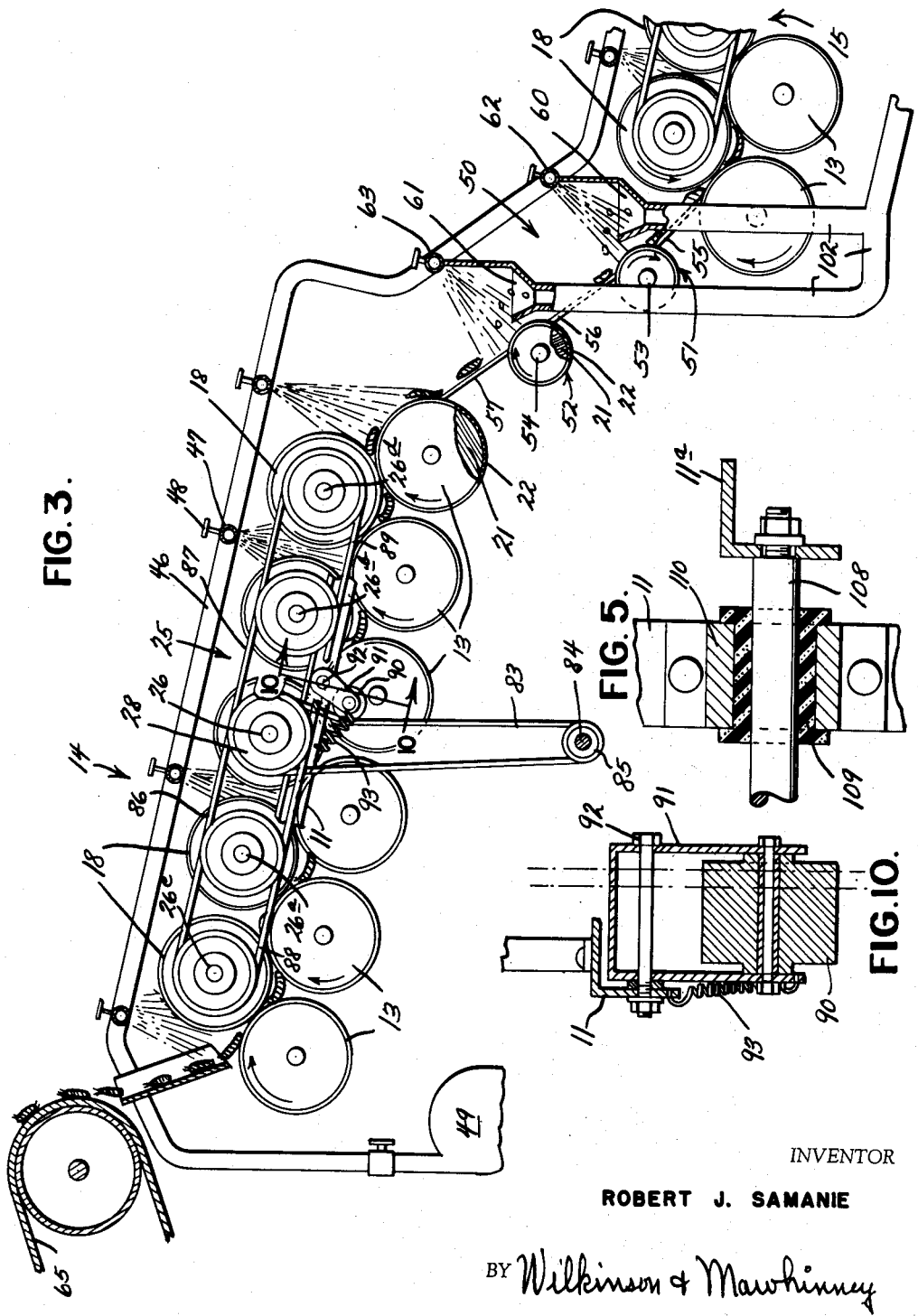
INVENTOR
ROBERT J. SAMANIE
BY Wilkinson & Mawhinney
ATTORNEYS July 5, 1955 R. J. SAMANIE 2,712,152
SHRIMP-PEELING AND CLEANING DEVICE
Filed July 21, 1952 4 Sheets-Sheet 4
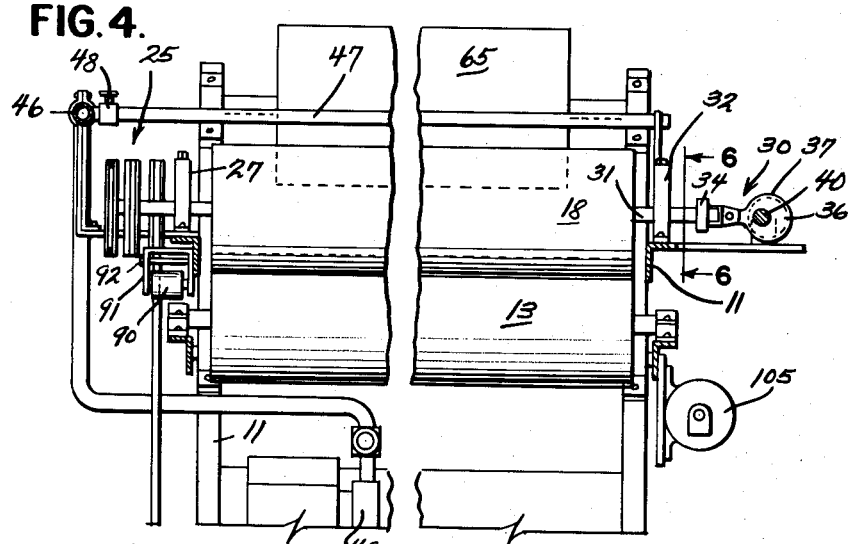
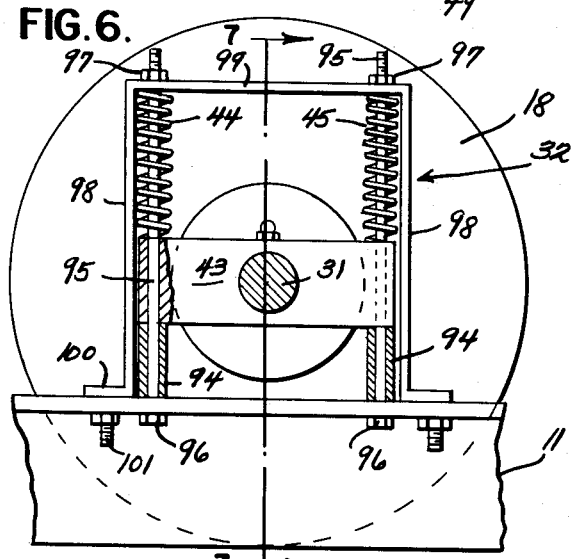
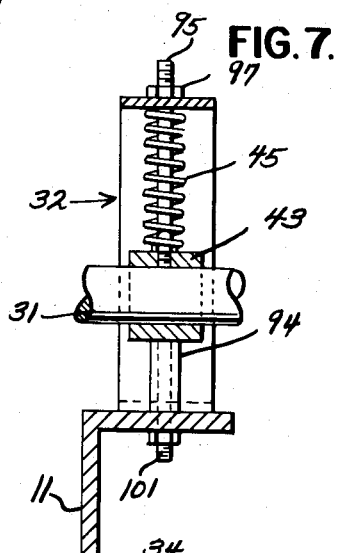
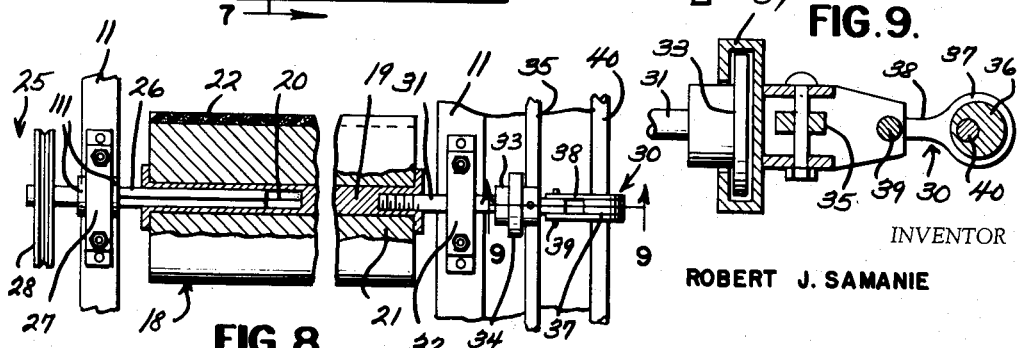
INVENTOR
ROBERT J. SAMANIE
BY *Wilkinson & Mawhinney*
ATTORNEYS United States Patent Office 2,712,152
Patented July 5, 1955

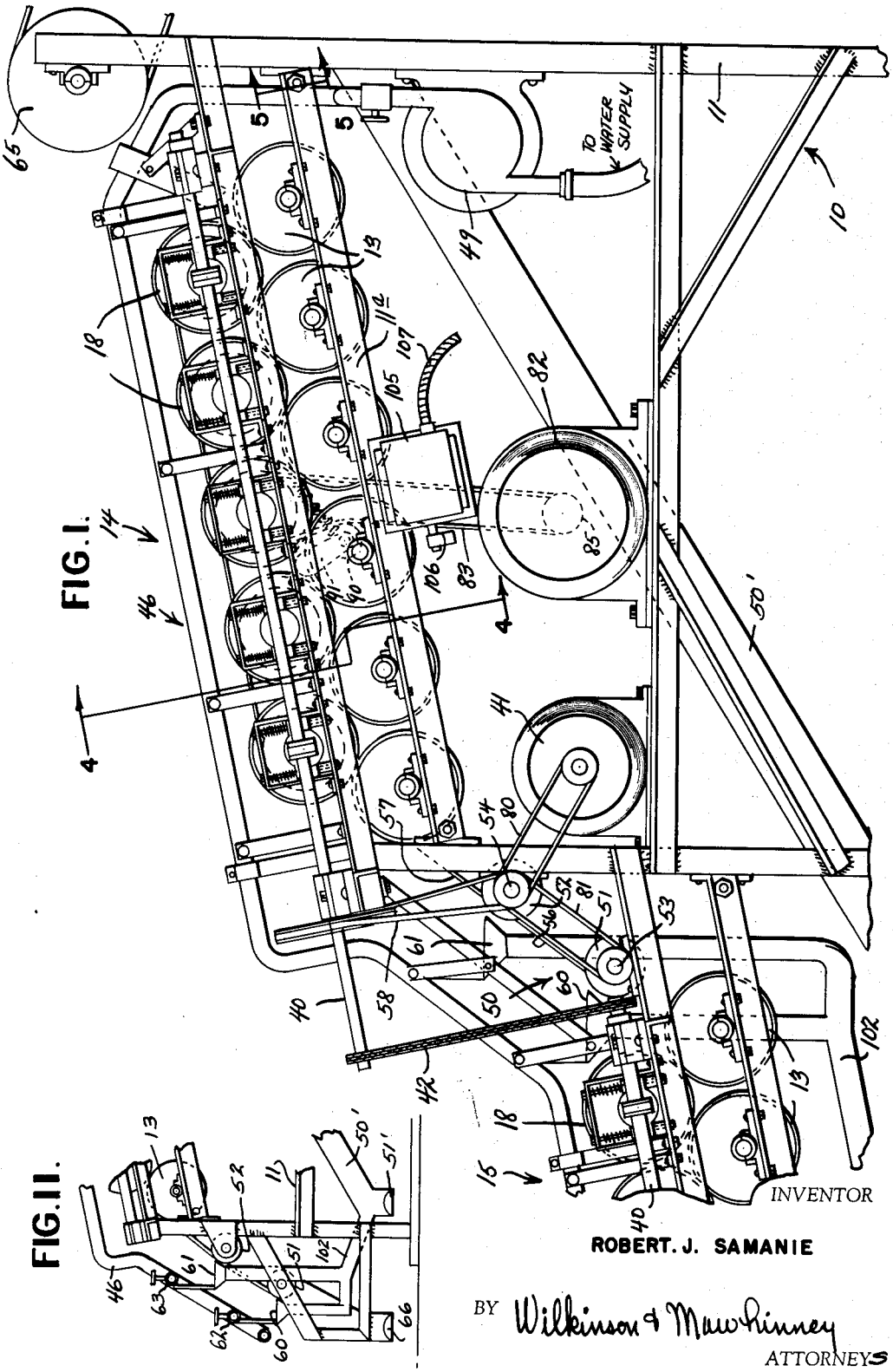

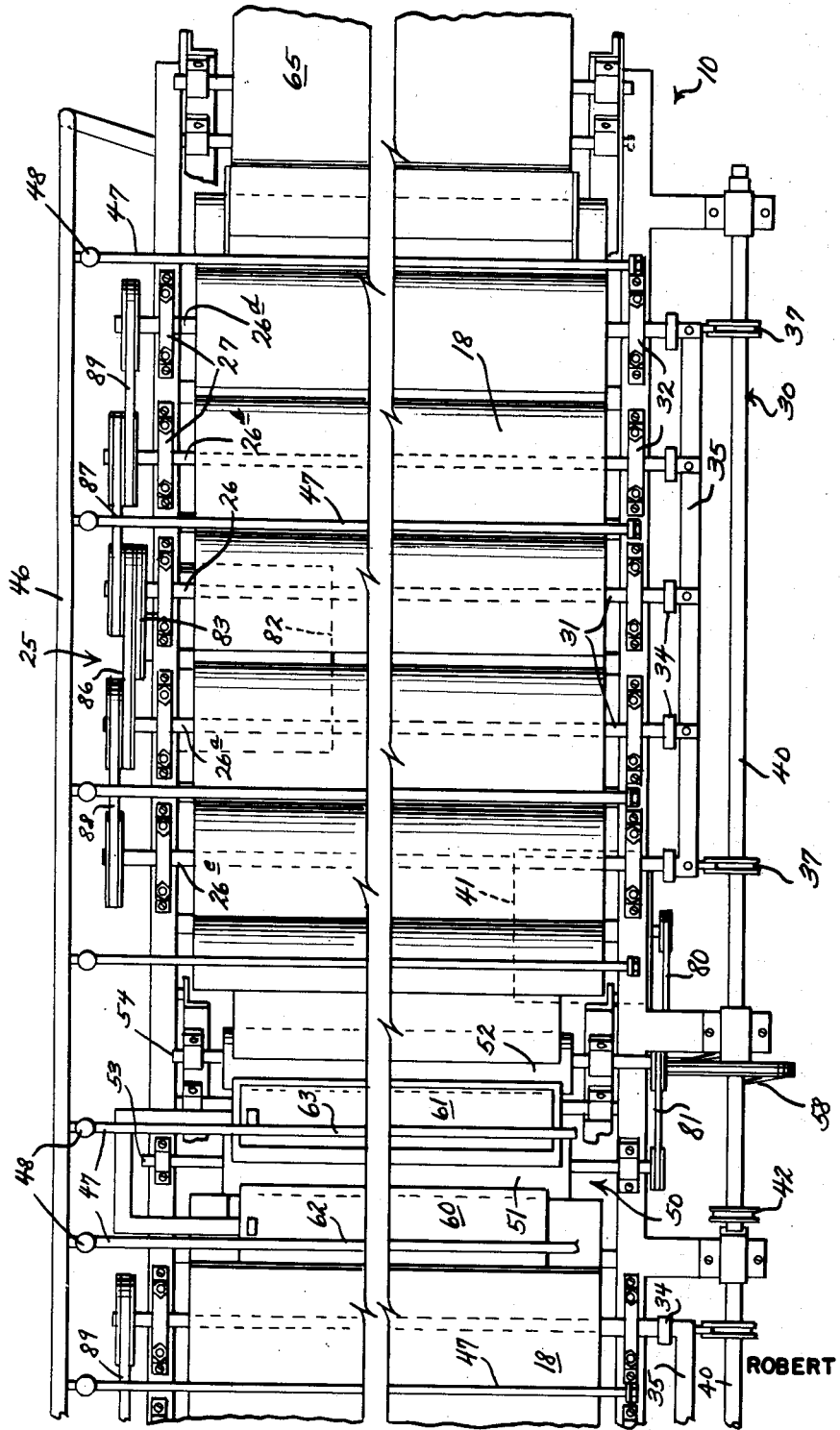

2,712,152

SHRIMP-PEELING AND CLEANING DEVICE

Robert J. Samanie, Houma, La.

Application July 21, 1952, Serial No. 299,995

17 Claims. (Cl. 17—2)

The present invention relates to improvements in a shrimp-peeling and cleaning device and is a continuation-in-part of my similarly entitled co-pending application, Serial No. 173,833, filed July 14, 1950, now abandoned.

An object of this invention is to provide a device for removing the meat of shrimp from their heads and hulls without crushing or otherwise destroying the meat.

It is another object of this invention to provide a device which is particularly adapted for peeling and cleaning shrimp of various sizes.

It is a further object of this invention to provide a novel means for separating the head and hull of shrimp from the shrimp meat in a simple and efficient manner.

It is a still further object of this invention to provide a shrimp-peeling and cleaning device which is relatively simple in structure, cheap to manufacture, and easy to operate.

A still further object of the invention is to provide a shrimp-peeling device in which rotating rollers exert a squeezing or pinching action upon the shrimp simultaneously with a rolling action achieved by the reciprocation of one of the rollers, and accompanied by a high frequency vibration applied to one of the rollers in order to break the membrane holding the sections of the hull or shell together and to thus loosen the sections of hull or shell from the shrimp meats.

It is a still further object of the invention to provide a novel device for the separation and separate discharge from the machine of the separated meats and hulls.

It is a still further object of the invention to provide, in a machine for peeling shrimp, an improved water flushing device which will wash down the shrimp heads and hulls and which will tend to keep the rollers clean and ease the passage of the shrimp through the machine and to maintain the guide plates moistened and relatively clean.

The above and further objects and advantages of the invention will become apparent upon consideration of the following detailed description of the invention when taken in conjunction with the accompanying drawings, wherein:

Figure 1 is a side elevational view of the shrimp-peeling and cleaning device of the present invention.

Figure 2 is a top plan view of the shrimp-peeling and cleaning device shown in Figure 1.

Figure 3 is a side elevational view taken from the opposite side of Figure 1 with parts broken away and parts shown in section.

Figure 4 is a cross-sectional view taken on the line 4—4 in Figure 1.

Figure 5 is a sectional view taken at an enlarged scale on the line 5—5 also in Figure 1.

Figure 6 is a vertical, longitudinal fragmentary section taken on a magnified scale on the line 6—6 in Figure 4.

Figure 7 is a vertical cross-sectional view taken on the line 7—7 of Figure 6.

Figure 8 is a plan view of one of the rollers showing a form of reciprocating motion for the same with parts of the roller and its mounting shown in section.

Figure 9 is a vertical sectional view taken on an enlarged scale on the line 9—9 of Figure 8.

Figure 10 is a vertical sectional view taken through the slack take-up roller for the drive belt and its associated mounting on an enlarged scale on the line 10—10 of Figure 3, and Figure 11 is a side elevational view showing the lower end of the lowermost tier illustrating a form of discharge both for the shrimp meat on the one hand and for the hulls and shells on the other hand.

Referring now more particularly to the drawings, wherein like reference numerals have been used throughout the several views to designate like parts, there is shown the shrimp-peeling and cleaning device of the present invention, generally designated by the reference numeral 10 which embodies a frame 11. Disposed in end-to-end spaced relation with respect to each other are a plurality of tiers of rollers, generally designated by the reference numerals 14, 15, etc., each of the tiers being disposed in a plane inclined with respect to the horizontal. Since the structure of each of the tiers of rollers 14, 15, etc., inclusive, is the same, it will suffice to describe only one in detail.

The tier of rollers 14 embodies a first set of rollers, generally designated by the reference numeral 13 positioned in side-by-side, slightly spaced relation with respect to each other, and mounted on the frame 11 for rotary movement about transverse axes. Positioned above and in staggered, contacting relation with respect to the first set of rollers 13, is a second set of rollers, generally designated by the reference numeral 18.

Referring now with particularity to Figure 8, there is shown one of the rollers 18 which embodies a shaft 19 which is provided with a bore 20 extending inwardly from one end thereof. Circumposed about the shaft 19 intermediate its ends is a roller body 21 which is fabricated of a soft sponge rubber and is provided with an outer covering 22 fabricated of a flexible, waterproof material. The outer cover 22 may be provided with ridges or grooves to present a relatively rough surface to the shrimp to be peeled and cleaned.

Operatively connected to the shaft 19 of each of the rollers 18 of the respective tiers is a drive mechanism, generally designated by the reference numeral 25, for effecting the rotary movement of the rollers of the second set 18. As previously pointed out, the respective rollers 18 of the tiers 14, 15, etc., inclusive, are in contacting engagement with the rollers of the first set 13, and therefore drive the latter upon being actuated by the drive mechanism 25.

The drive mechanism 25 embodies a stub shaft 26 rotatably journaled intermediate its ends on the frame 11 by means of the bearing 27 and having one end slidably received and supported within the bore 20 of the shaft 19 of the adjacent one of the rollers 18. The other end of each of the stub shafts 26 is provided with a drive pulley 28 which is engaged by a belt as hereinafter described. Accordingly, each of the rollers of the second set 18 of the tiers 14, 15, etc., inclusive, will be rotated about an axis extending transversely of the frame and effect a corresponding rotation of the rollers of the first set 13 of the tiers.

Operatively connected to the other end of each of the rollers 18 of the tiers 14, 15, etc., inclusive, is a reciprocating mechanism, generally designated by the reference numeral 30 for imparting a reciprocatory movement to the rollers 18 longitudinally of the rollers 13. As clearly shown in Figures 8 and 9, there is shown the reciprocating mechanism which embodies a stub shaft 31 mounted on the frame 11 intermediate its ends by means of the bearing 32, the shaft having one end fixedly secured to the adjacent end of the shaft 19 and having its other end provided with a flanged annular collar 33 which is loosely received and supported within an annular housing 34. Accordingly, the stub shaft 31 rotatably supports the adjacent end of the shaft 19. As clearly shown in Figure 2, a connecting rod extends between the annular housings 34 of each set of rollers 18, the connecting rod being generally designated by the reference numeral 35. Operatively connected to the end adjacent ones of the annular housings 34 carried by the connecting rod 35 is an eccentric 36, the operative connection being effected by means of a collar 37 circumposed about the eccentric 36 and an arm 38 carried by the collar 37 and pivotally supported to the annular housing 34 by means of the pivot pin 39. The eccentric 36 is secured to drive shaft 40 which is driven by a motor 41. As clearly shown in Figures 1 and 2, each of the tiers 14, 15, etc. is provided with a similar reciprocating mechanism 30, the adjacent reciprocating mechanisms being coupled together by means of the sprocket chains, generally designated by the reference numeral 42. Accordingly, upon connecting the motor 41 to a remote source of electrical energy, the rollers 18 of the tiers 14, 15, etc. will be reciprocated longitudinally of the rollers 13. It is to be noted, upon reference to Figure 8, that the end of the stub shaft 26 received within the bore 20 is squared, so that the desired reciprocatory movement can be effected without hindering the operability of the drive mechanism 25 which rotates the rollers 18.

In Figure 6 there is shown the rotatable mounting for the rollers 18, the mounting including a bearing 43 which is resiliently supported on the frame 11 by means of the springs 44 and 45. Accordingly, when relatively large shrimp pass between the rollers 13 and 18, the bearing 43 will be permitted to ride up due to its resilient mounting to thereby release the excessive pressure on the shrimp which may cause damage to the meat thereof.

Overlying the tiers of rollers 14, 15, etc., inclusive, and supported on the frame 11 is a watering system, generally designated by the reference numeral 46 which embodies a plurality of transversely extending, perforated conduits 47, each of the conduits being provided with a suitable control valve 48. The watering system 46 is a closed one, and is provided with a pump 49 for circulating the water through the conduits 47. As the water passes over the outer covering 22 of the rollers 13, 18, the accumulated shrimp heads and hulls will be washed downwardly into a pan 50' which underlies the tiers of rollers 14, 15, etc., inclusive, and is supported within the frame 11.

As clearly shown in Figure 1, the pan 50' is inclined and is provided with a cleaning port 51 contiguous to its lower end for the removal of the accumulated water and shrimp heads and hulls.

Positioned intermediate the spaced ends of tiers 14, 15, etc., inclusive, and supported on the frame 11 is a separating means, generally designated by the reference numeral 50 for separating the meat of the shrimp from the loosened hulls and heads. As clearly shown in Figure 3, the separating means 50 embodies a pair of rollers 51 and 52 mounted on the frame 11 for rotary movement about spaced, transversely extending axes 53 and 54. Extending between the rollers 51, 52 and the adjacent rollers 13 of the tiers 15, 16 are the guide plates 55, 56 and 57. As clearly shown in Figure 1, the rollers 51, 52 are connected to the adjacent drive shaft 40 by means of a belt and pulley, generally designated by the reference numeral 58, to thereby impart a counterclockwise rotary movement to each of the rollers 51, 52. Positioned contiguous to and spaced above each of the rollers 51, 52 is a bucket 60, 61, the buckets being supported on the frame 11. The disposition of the buckets 60 and 61 is selected with respect to the rollers 51 and 52, so that the lighter shrimp hulls and heads will be separated from the shrimp meat by a centrifugal force applied to the lighter waste products. It is to be further noted that the watering system 46 is provided with jets 62, 63 facing the rollers 51, 52 to maintain the latter and the adjacent guide plates moistened and relatively clean.

Contiguous to the uppermost end of the tier 14 is a conveyor means, generally designated by the reference numeral 65, for carrying the shrimp into the adjacent uppermost end of the tier 14.

Contiguous to the lowermost end of the shrimp-peeling and cleaning device 10 of the present invention there is provided a receptacle 66 for receiving the cleaned and peeled shrimp from the adjacent one of the separating means 50.

The electric or other motor 41 drives the shaft 54 at high speed through a belt 80 (Figure 1), while a belt 81 transmits high speed rotation from shaft 54 to shaft 53 and the belt 58 transmits slower motion from the shaft 54 to the cam shaft 40.

Rotation of the rollers 18 may be accomplished by any suitable drive, for instance by belting the power from an electric motor 82 through a belt drive 83. In Figure 3 the armature shaft 84 of the motor 82 is shown as having a fast pulley 85 engaged by the belt 83 at its lower end. The upper end of the belt 83 is trained about a pulley 28 fast on the shaft 26 of the central upper roller 18. The power thus supplied to the central upper roller 18 is transmitted to the other rollers 18 of the upper series by a system of connecting belts. The belts 86 and 87 drive the shafts 26$^a$ and 26$^b$ of the rollers 18 immediately adjacent the central roller while belts 88 and 89 drive the shafts 26$^c$ and 26$^d$ of the remote rollers 18.

An idler pulley 90 is mounted to swing from a bracket 91 pivoted at 92 to the frame of the machine and is urged against one run of the belt 83 by a spring 93 so that the pulley is in the nature of a belt tightener.

In Figure 6, limit sleeves 94 are shown as placed below the bearing blocks 43 to limit the downward movement of the blocks 43 and their rollers 18 under the influence of springs 44 and 45. The blocks 43 may slide up and down on guide rods 95 which pass through the coil springs 44, 45 and the sleeves 94. Heads 96 on the lower ends of the guide rods 95 engage beneath the frame member 11 while the sleeves 94 seat on the upper surface of this frame member 11. The springs 44, 45 abut at their lower ends against the sliding bearing blocks 43 and at their upper ends against the fixed cross bars 99 supported by the uprights 98. These uprights 98 and the cross bars 99 constitute spring frames having feet 100 resting upon the frame member 11 to which they are bolted by the bolts 101.

Shell and trash removal ducts 102 are connected to the buckets or troughs 60, 61. The waste is removed by water fed into the buckets or troughs 60, 61 by the jets 62, 63.

The lower banks of rollers 13, together with their shafts 103 and bearings 104, are mounted upon and carried by vibratable frame members 11$^a$, the ends of which are mounted to the main rigid frame 11 by pillar blocks which permit of a high frequency vibration produced by a high speed electric motor 105 affixed to the frame 11$^a$, the rotary armature shaft of which has affixed thereto an eccentric weight 106. The motor 105 and eccentric weight 106 will produce a high frequency vibration of not less than 500 per minute and an optimum frequency for efficient operation will be as high as 2,000 per minute. A flexible cable 107 from the motor 105 is connected to any appropriate source of electromotive force for driving the motor without interfering with its vibration.

A form of pillar block is illustrated in Figure 5 in which the frame members 11$^a$ are supported resiliently by shafts 108 journaled in rubber bearing blocks 109 carried in suitable journal boxes 110 affixed to the main rigid frame 11.

In Figure 8 it is made clear that the square cavities 20 of the shafts 19 are of greater axial lengths than the square sections of the shafts 26 that fit therein. This provides clearance for the rollers 18 to reciprocate axially without any interference from the rotary drive derived from the shafts 26.

Set collars 111 are shown in Figure 8 as being mounted on opposite sides of the bearings 27, or their bearing blocks 43 to prevent casual sliding movement of the shafts 26 in axial directions.

In actual use, the shrimp are conveyed into the uppermost end of the central tier 14, whereupon they pass downwardly through the tier 14, the heads and hulls being loosened from the shrimp meat, due to the rotary and reciprocatory movement of the rollers 18. The shrimp then pass through the separating means 50 disposed intermediate the tier 14 and the tier 15, the separated hulls and trash being thrown into the adjacent buckets 60, 61. The shrimp then pass downwardly through the tier 15 and into the separating means 50 disposed intermediate the tier 15 and the next lower tier. The shrimp may be passed through any desired number of tiers. Each successive stage conduces to loosen the shrimp heads and hulls from the meat until finally practically all of the shrimp are withdrawn in a cleaned and peeled condition from the separating means 50 contiguous to the lower end of the lowermost tier. In actual use it may be determined advisable to delete several of the tiers or add additional tiers, the number of tiers depending upon the separating conditions, such as the size and speed of the rollers 13, 18.

As the shrimp pass through the machine the hulls and trash will be separated from the meats by the buckets 60, 61 and the removable ducts 102, so that when the meats arrive at the lower end of the lowermost tier they are delivered into the receptacle shown in Figure 11 in a separated condition; that is, the meat alone, apart from all trash, is delivered to the receptacle 66.

Some of the hulls and trash however may be drawn between and through the lower sets of rollers 13, in which event such trash is caught by pan 50' and later evacuated at the cleaning port 51' shown in Figure 11. The pan 50' and its cleaning port 51' may or may not be employed. The upper rollers 18 are directionally rotated by belt or other power from the electric or other motor 82. As shown by the arrows in Figure 3 such rollers 18 are rotated counterclockwise. By frictional contact, induced by springs 44, 45, the upper rollers 18 drive the lower rollers 13, but in relatively opposite direction, namely clockwise. The shrimp as it is drawn into the nips or bights of cooperating rollers 18, 13 and the hulls and trash are pinched so that the meat is freed and ejected therefrom.

Each upper roller 18 is kept in contact with its companion lower rollers 13 by yieldable pressure from the springs 44, 45 and the shrimp are subjected to this yieldable spring pressure.

In the peeling action of the machine, it is pointed out that the hull or shell of a shrimp does not entirely surround the meat. In cross-section, the hull somewhat resembles a horse shoe with the mouth of the shoe at the belly of the shrimp. Further, the shell is composed of several sections joined together by a membrane underneath the shel land over the shrimp meat. There is a head section of hull, a tail section and several intermediate sections. The "feet" or swimmerettes of the shrimp are attached to the membrane covering the underpart or belly of the shrimp.

The rotary action of the rollers of itself probably has little peeling effect upon the shrimp since the rotation of the rollers simply exerts a "squeezing" action upon the entire shrimp as it is drawn from one combination of rollers into another. However, once the hulls of the shrimp, or one section of the hull, has been loosened (either by means of reciprocation of the upper rollers 18 or by the high frequency vibration applied to the lower rollers, or both), the rotary action of the rollers does cause the separation of the sections of hull or shell from the shrimp meats. This is accomplished in two ways. First, the pressure of the rollers 18, 13 tends to squeeze the meat from the loosened section of hull. Second, inasmuch as a section of the hull once it is loosened from the meat is more compressible than the meat, the hull is propelled laterally across the rollers at a more extreme periphery of the rollers than the thicker meats and accordingly at a greater speed than the meats.

The functions of the reciprocatory action of the upper rollers and of the high frequency vibration applied to the lower rollers 13 are to break the membrane holding the sections of the hull or shell together and to loosen the sections of hull or shell from the shrimp meats. This is accomplished as follows:

When the shrimp is caught between an upper and a lower roller, the reciprocation of the upper roller 18 tends to pull the shell or hull on the upper side of the shrimp in the direction of the axial travel of the upper roller 18. No such pulling tendency is applied to the hull or shell on the underside of the shrimp because such underside is in contact with the axially immovable lower roller 13. The shrimp tend to travel between the rollers on its side rather than on its back or on its belly, since the thickness of a shrimp is usually less than its height. A distortion of the shell is thus induced which breaks the connecting membranes of the shell sections and loosens the sections of shell from the meat. This distortion of the shell and resulting loosening action is accelerated by the high speed vibration applied to the frame of the lower rollers 13, since such vibration tends to give greater jerkiness to the action produced by the reciprocation of the upper rollers.

The shrimp pass between the upper and lower sets of rollers and are carried along down the tier of rollers by the rotary movement of the rollers. The reciprocatory action of the upper rollers tends to roll the shrimp between the surfaces of the upper and lower rollers somewhat in the manner of a pencil being rolled between the palms of the hands. As above stated such action tends to loosen the hulls from the shrimp meat and eventually results in the complete separation of the meats from the hulls.

When large shrimp enter the nips between the rollers the upper rollers may rise compressing the springs 44, 45, which springs will return the rollers 18 downwardly as limited by the sleeves 94 after passage of such shrimp. Incident to this rising movement of the upper rollers, the belt tightener 90 may be caused to swing in its bracket 91, distending the spring 93. In other words this roller 90 places a bight in the adjacent run of the belt 83, which bight tends to straighten out on the rise of the roller 18; the action being compensated for by the swinging movement of the belt tightener roller 90. At the same time this roller 90 under the influence of its spring 93 maintains the belt 83 tight at all times around its pulleys 85, 28 so as not to impair the drive from the electric motor 82 to the upper bank of rollers 18.

In the separating devices 50 the rollers 52, 51 rotate at high speed. As the waste products slide down plates 57, 56 and encounter these rollers, which are rotating clockwise as viewed in Figure 3, such waste products are thrown outwardly by impact in a direction to enter the buckets 61, 60, the spray jets 63, 62 contributing to this end.

Referring to Figure 6, nuts 97 are threaded upon the upper ends of the guide rods 95 which project up above the cross-bars 99 of the spring frames 98. These nuts hold the rods 95 from dropping through the springs 44, 45 and through the bearing blocks 43 and sleeves 94. The nuts 97 also tend to hold the spring frames down tightly upon the machine frame 11 and otherwise tend to stablize the spring frames 98, 99.

It is readily appreciated that numerous modifications

What I claim is:

1. A shrimp-peeling and cleaning device comprising a frame, a plurality of tiers of rollers, said tiers being disposed in end-to-end spaced relation with respect to each other and supported on said frame, each of said tiers comprising a first set of rollers disposed in side-by-side relation with respect to each other and mounted on said frame for rotary movement about a transverse axis, and a second set of rollers positioned above and in staggered contacting relation with respect to said first set and mounted for rotary movement about a second transverse axis and for axial reciprocatory movement therealong to thereby loosen the shrimp hulls and heads from the shrimp meat, means operatively connected to said plurality of tiers for effecting the rotary and reciprocatory movements of the rollers of said second set, and means disposed intermediate the spaced ends of said tiers and supported on said frame for separating the shrimp meat from the loosened hulls and heads, said last-named means comprising a high speed roller, and a bucket adjacent said roller for the reception of the lighter heads and hulls thrown outwardly by said high speed roller.

2. A shrimp-peeling and cleaning device comprising a frame, a plurality of tiers of rollers, said tiers being disposed in end-to-end spaced relation with respect to each other and supported on said frame, each of said tiers comprising a first set of rollers disposed in side-by-side relation with respect to each other and mounted on said frame for rotary movement about a transverse axis, and a second set of rollers positioned above and in staggered contacting relation with respect to said first set and mounted for rotary movement about a second transverse axis and for axial reciprocatory movement therealong to thereby loosen the shrimp hulls and heads from the shrimp meat, means operatively connected to said plurality of tiers for effecting the rotary and reciprocatory movement of the rollers of said second set, and centrifugal separating means disposed intermediate the spaced ends of said tiers and supported on said frame for separating the shrimp meat from the loosened hulls and heads.

3. A shrimp-peeling and cleaning device comprising a frame, a plurality of tiers of rollers, said tiers being disposed in end-to-end spaced relation with respect to each other and supported on said frame, each of said tiers comprising a first set of rollers disposed in side-by-side relation with respect to each other and mounted on said frame for rotary movement about a transverse axis, and a second set of rollers positioned above and in staggered contacting relation with respect to said first set and mounted for rotary movement about a second transverse axis and for axial reciprocatory movement therealong to thereby loosen the shrimp hulls and heads from the shrimp meat, means operatively connected to said plurality of tiers for effecting the rotary and reciprocatory movement of the rollers of said second set, means disposed intermediate the spaced ends of said tiers and supported on said frame for separating the shrimp meat from the loosened hulls and heads, and a water-spraying system positioned above and directed toward said tiers of rollers and supported on said frame.

4. A shrimp-peeling and cleaning device comprising a frame, a plurality of tiers of rollers, said tiers being disposed in end-to-end spaced relation with respect to each other and supported on said frame, each of said tiers comprising a first set of rollers disposed in side-by-side relation with respect to each other and mounted on said frame for rotary movement about a transverse axis, and a second set of rollers positioned above and in staggered contacting relation with respect to said first set and mounted for rotary movement about a second transverse axis and for axial reciprocatory movement therealong to thereby loosen the shrimp hulls and heads from the shrimp meat, means operatively connected to said plurality of tiers for effecting the rotary and reciprocatory movement of the rollers of said second set, means disposed intermediate the spaced ends of said tiers and supported on said frame for separating the shrimp meat from the loosened hulls and heads, and a water-spraying system positioned above and directed toward said tiers of rollers and supported on said frame, and an elongated inclined pan positioned beneath said tiers of rollers and supported on said frame.

5. A shrimp-peeling and cleaning device comprising a frame, a plurality of tiers of rollers, said tiers being disposed in end-to-end spaced relation with respect to each other and supported on said frame, each of said tiers being inclined with respect to the horizontal and comprising a first set of rollers disposed in side-by-side spaced relation with respect to each other and mounted for rotary movement about a transverse axis, a second set of rollers positioned above and in staggered contacting relation with respect to said first set of rollers, resilient mounting means associated with said second set of rollers for mounting said rollers for rotary movement about a second transverse axis, means carried by said frame and operatively connected to said second set of rollers for mounting the latter for axial reciprocatory movement longitudinally of said first set of rollers, power means operatively connected to said plurality of tiers for effecting the rotary and reciprocatory movement of the rollers of said second set, and means disposed intermediate the spaced ends of said tiers and supported on said frame for separating the shrimp meat from the loosened shrimp hulls and heads.

6. A shrimp-peeling and cleaning device comprising a frame, a plurality of tiers of rollers, said tiers being disposed in end-to-end spaced relation with respect to each other and supported on said frame, each of said tiers comprising a first set of rollers disposed in side-by-side relation with respect to each other and mounted on said frame for rotary movement about a transverse axis, and a second set of rollers positioned above and in staggered contacting relation with respect to said first set and mounted for rotary movement about a second transverse axis and for axial reciprocatory movement therealong to thereby loosen the shrimp hulls and heads from the shrimp meat, and means operatively connected to said plurality of tiers for effecting the rotary and reciprocatory movement of the rollers of said second set.

7. A shrimp-peeling and cleaning device comprising a frame, a plurality of tiers of rollers, said tiers being disposed in end-to-end spaced relation with respect to each other and supported on said frame, each of said tiers comprising a first set of rollers disposed in side-by-side relation with respect to each other and mounted on said frame for rotary movement about a transverse axis, and a second set of rollers positioned above and in staggered contacting relation with respect to said first set and mounted for rotary movement about a second transverse axis and for axial reciprocatory movement therealong to thereby loosen the shrimp hulls and heads from the shrimp meat, means operatively connected to said plurality of tiers for effecting the rotary and reciprocatory movements of the rollers of said second set, and means disposed intermediate the spaced ends of said tiers and supported on said frame for separating the shrimp meat from the loosened hulls and heads.

8. A shrimp-peeling and cleaning device comprising a frame, a plurality of tiers of rollers, said tiers being disposed in end-to-end spaced relation with respect to each other and supported on said frame, each of said tiers being inclined with respect to the horizontal and comprising a first set of rollers disposed in side-by-side spaced relation with respect to each other and mounted for rotary movement about a transverse axis, a second set of rollers positioned above and in staggered contacting relation with respect to said first set of rollers, resilient mounting means associated with said second set of rollers for mounting said rollers for rotary movement about a second transverse axis, means carried by said frame and operatively connected to said second set of rollers for mounting the latter for axial reciprocatory movement longitudinally of said first set of rollers, and power means operatively connected to said plurality of tiers for effecting the rotary and reciprocatory movement of the rollers of said second set.

9. In a shrimp-peeling device, a pair of oppositely rotating rollers disposed in side by side relation for the passage of shrimp between their adjacent peripheral surfaces, means associated with one of said rollers for mounting such roller for axial movement simultaneously with the rotary movement of the rollers, and means associated with said axially movable roller for axially moving such roller whereby shrimp passing transversely of the longitudinal axes of the rollers between the rollers are rolled longitudinally of the rollers during said passage to peel the shrimp.

10. A shrimp-peeling and cleaning device comprising a pair of inclined tiers of rollers, said tiers being disposed in spaced end to end relation, each of said tiers including cooperating upper and lower sets of rotating rollers, means associated with said rollers of the second set for mounting such rollers for axial movement simultaneously with the rotary movement of the rollers, means associated with said axially movable rollers of the second set for axially moving such rollers so that shrimp passing transversely of the longitudinal axes of the rollers are rolled longitudinally of the rollers to loosen the meat from the hulls, and means disposed intermediate the spaced ends of said tiers for separating the shrimp meat from the loosened hulls.

11. In a shrimp peeling device, a pair of oppositely rotating rollers disposed in side by side relation for the passage of shrimp between their adjacent peripheral surfaces transversely of the longitudinal axes thereof, one of said rollers being axially reciprocable simultaneously with the rotary movement of the rollers and means operatively associated with said one roller for axially moving said roller whereby shrimp passing between the rollers are rolled longitudinally of the rollers during said passage to break the shells from the meat.

12. In a shrimp peeling device, a pair of oppositely rotating rollers disposed in side by side relation for the passage of shrimp between their adjacent peripheral surfaces transversely of the longitudinal axes thereof, one of said rollers being axially reciprocable simultaneously with the rotary movement of the rollers, means operatively associated with said one roller for axially moving said roller whereby shrimp passing between the rollers are rolled longitudinally of the rollers during said passage to break the shells from the meat and means associated with one of said rollers for subjecting said such roller to high frequency vibration.

13. A shrimp peeling device comprising a supporting means, pairs of opposed rotary rollers mounted on the supporting means in side by side relation to receive shrimp between said pairs of opposed rollers transversely of their axes, means associated with at least one of the pairs of rollers for mounting it for axially sliding movement and means associated with said foregoing means for axially reciprocating said rollers of said pairs simultaneously with the rotary movement of the rollers.

14. A shrimp peeling device comprising a supporting means, a pair of rotary rollers mounted on the supporting means in opposed relation defining a nip to receive shrimp therein transversely of their axes, means associated with at least one of the rollers mounting it for axially sliding movement and means associated with said foregoing means for axially reciprocating said roller simultaneously with the rotary movement of the rollers, said supporting means being inclined and said rollers being mounted transversely of the inclination.

15. In a shrimp peeling device, a rotary roller and a companion rotary and axially reciprocable roller disposed in opposed relationship therewith, said rollers providing a nip through which shrimp pass transversely of the longitudinal axes of the rollers, the shrimp being rolled longitudinally of the rollers as they are pinched laterally of the rollers.

16. A shrimp peeling machine comprising a pair of rotary rollers, one at least of which has a compressible covering, defining therebetween a nip into which shrimp are fed, means operatively associated with one of said rollers to axially shift said roller relative to the other, and means operatively associated with the other of said rollers to vibrate same.

17. A shrimp peeling machine comprising a first rotary roller having a fixed axis of translation, a second rotary roller positioned opposite said first roller and defining therewith a nip into which shrimp are fed, means operatively associated with said second roller to axially shift said second roller relative to said first roller, and means operatively associated with said first roller to vibrate said first roller.

References Cited in the file of this patent

UNITED STATES PATENTS

| 1,136,387 | Young et al. | Apr. 20, 1915 |
| 1,615,081 | Hardie | Jan. 18, 1927 |
| 1,703,123 | Triplett | Feb. 26, 1929 |
| 2,169,905 | Sevek | Aug. 15, 1939 |
| 2,218,466 | Gray et al. | Oct. 15, 1940 |
| 2,249,394 | Noffsinger | July 15, 1941 |
| 2,274,887 | Collier | Mar. 3, 1942 |
| 2,574,044 | Lapeyre et al. | Nov. 6, 1951 |

FOREIGN PATENTS

| 526,128 | Great Britain | Sept. 11, 1940 |